United States Patent [19]

Vidrio

[11] B 3,919,425
[45] Nov. 11, 1975

[54] METHOD OF PRODUCING VASODILATION USING CERTAIN 3-SUBSTITUTED-QUINAZOLINE DERIVATIVES

[75] Inventor: Horacio Vidrio, Mexico City, Mexico

[73] Assignee: Miles Laboratories, Inc., Elkhart, Ind.

[22] Filed: Mar. 1, 1973

[21] Appl. No.: 336,946

[44] Published under the Trial Voluntary Protest Program on January 28, 1975 as document no. B 336,946.

Related U.S. Application Data

[63] Continuation-in-part of Ser. No. 132,911, April 9, 1971, abandoned.

[52] U.S. Cl. ............................................. 424/251
[51] Int. Cl.² ........................................ A61K 31/305
[58] Field of Search ................................. 424/251

[56] References Cited
UNITED STATES PATENTS
3,274,194   9/1966   Hayao ........................... 260/256.4

*Primary Examiner*—Sam Rosen
*Attorney, Agent, or Firm*—Myron B. Sokolowski

[57] ABSTRACT

Certain 3-substituted-2,4(1H,3H)-di-oxo-quinazoline and 3-substituted-2-thio-4-oxo(1H,3H)-quinazoline derivatives and pharmaceutically acceptable acid addition salts thereof having the formula

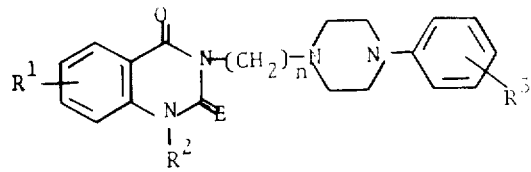

wherein $R^1$ is hydrogen or halogen, $R^2$ is hydrogen or methyl, E is oxygen or sulfur, $R^3$ is hydrogen or halogen, and n has a value of from 1 to 6, produce vasodilation in animals.

23 Claims, No Drawings

METHOD OF PRODUCING VASODILATION USING CERTAIN 3-SUBSTITUTED-QUINAZOLINE DERIVATIVES

CROSS-REFERENCE

This application is a continuation-in-part of U.S. Pat. application Ser. No. 132,911, filed on Apr. 9, 1971 which is now abandoned.

BACKGROUND OF THE INVENTION

1. Field of the Invention

Vasodilation is defined as an increase in or the widening of the lumen of blood vessel without regard to whether the latter is a member of the arterial or venous part of the circulatory system of animals. One of the principal physiological effects of vasodilation is a net increase of blood flow in the vascular bed of a tissue, organ, or system. Vasodilation can be induced in experimental animals and man by the administration of certain pharmacologically active agents known as vasodilators.

Vasodilation may be a therapeutic objective in certain vasopathies to correct inadequacies of regional blood flow, for example, in the cutaneous, muscular (skeletal or cardiac), or cerebral circulation and to adjust imbalances between tissue requirements and the delivery and removal of metabolic substances by the blood stream. Examples of conditions where vasodilation may be therapeutically desirable are: intermittent claudication, arteriosclerosis obliterans, Raynaud's phenomenon, Meniere's syndrome, thrombophlebitis, local frostbite, and nocturnal leg cramps.

From a pharmacodynamic standpoint, known vasodilators may produce alpha adrenergic blockage, stimulate beta adrenergic receptors, or relax smooth muscle directly. Tolazoline and phentolamine are examples of vasodilators which block alpha adrenergic receptors. The latter compounds, however, cause undesirable side effects which are attributable to cardiac and gastric stimulation. Hence, tolazoline and phentolamine have been reported to cause tachycardia, cardiac arrhythmias, abdominal pain, nausea, diarrhea, and aggravation of peptic ulcers. Isoxsuprine and nylidrin are examples of vasodilators which stimulate beta adrenergic receptors. Although both drugs have been proposed for the treatment of a variety of peripheral vascular disorders, they may cause a variety of side effects such as nervousness, dizziness, palpitation, nausea, and vomiting. Among vasodilators which directly relax smooth muscle, papaverine, dioxyline and cyclan-delate are representative. Papaverine and dioxyline, when administered in large doses, have been reported to cause serious arrhythmias because of depression of A-V and intraventrical conduction. Cyclandelate at 200 mg doses causes unpleasant side effects such as headache and dizziness in many cases. For a more detailed summary of the field, refer to: Nickerson, Mark, "Vasodilator Drugs," in *The Pharmacological Basis of Therapeutics*, 4th edition, L. S. Goodman and A. Gilman, editors, New York, MacMillan and Co., 1970, Chapter 34, pages 751–760. The compounds utilized in the method disclosed in the instant application elicit their effects by alpha adrenergic blockade and by direct relaxation of smooth muscle.

2. Description of the Prior Art

The following references are indicative of the prior art pertaining to compounds containing the quinazoline nucleus and their pharmacological activity: U.S. Pat. No. 3,047,462 (July 31, 1962 to Maillard et atl.) for 3-substituted-3,4-dihydroquinazol-4-ones possessing antiinflammatory activity; U.S. Pat. No. 3,248,292 (Apr. 26, 1966 to Minielli and Scarborough) for 2,4-substituted-6,7-dimethoxyquinazoline compounds useful as bronchodilators and antiinflammatory agents; U.S. Pat. No. 3,591,695 (July 6, 1971 to Ott) disclosing certain CNS-active 4-phenyl-3,4-dihydroquinazolines useful as antidepressants; and U.S. Pat. No. 3,274,194 (Sept. 20, 1966 to Hayao et al.) for 3-substituted-2,4(1H,3H)-dioxoquinazoline compounds having antiinflammatory or sedative properties.

In standard pharmacological treatises, 2,3-disubstituted-quinazolones are described as hypnotics (e.g., see Sharpless, Seth K., "Hypnotics and Sedatives," in *The Pharmacological Basis of Therapeutics*, 4th edition, L.S. Goodman and A. Gilman, editors, New York, MacMillan and Co., 1970, Chapter 10, pages 122 and 131).

The use of the 3-substituted-2,4(1H,3H)-dioxyquinazolines and 3-substituted-2-thio-4-oxo-quinazoline compounds disclosed in the instant application as a method of producing vasodilation in animals has not been reported.

SUMMARY

Disclosed herein is a method of producing vasodilation in animals by the administration of an effective amount of certain 3-substituted-2,4(1H,3H)-dioxoquinazoline or 3-substituted-2-thio-4-oxo(1H,3H)-quinazoline compounds or pharmaceutically acceptable acid addition salts of either class having the structural formula

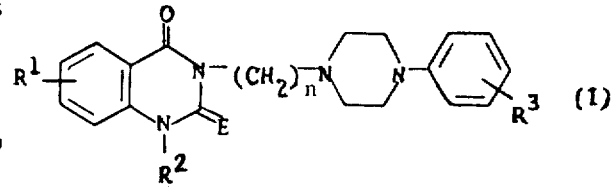

wherein $R^1$ is hydrogen or halogen, $R^2$ is hydrogen or methyl, E is oxygen or sulfur, $R^3$ is hydrogen or halogen, and $n$ has a value of from 1 to 6.

The following compounds are particularly useful in the method:

6-chloro-1-methyl-3-[3-(4-phenyl-1-piperazinyl)-propyl]-2,4-(1H,3H)-quinazolinedione hydrochloride;

3-[5-(4-m-chlorophenyl-1-piperazinyl)-pentyl]-2,4(1H,3H)-quinazolinedione hydrochloride;

3-[5-(4-phenyl-1-piperazinyl)-pentyl]-2-thio-4-oxo (1H,3H)-quinazoline dihydrochloride;

3-[3-(4-m-chlorophenyl-1-piperazinyl)-propyl]-2-thio-4-oxo(-H,3H)-quinazoline maleate;

3-[2-(4-m-chlorophenyl-1-piperazinyl)-ethyl]-2,4(1H,3H)quinazolinedione maleate;

3[3-(4-phenyl-1-piperazinyl)-propyl]-6-chloro-2-thio-4-oxo(1H,3H)-quinazoline hydrochloride;

6-chloro-3-[2-(4-phenyl-1-piperazinyl)-ethyl]-2,4 (1H,3H)-quinazolinedione maleate;

6-chloro-3-[4-(4-phenyl-1-piperazinyl)-butyl]-2,4 (1H,3H)-quinazolinedione maleate;

6-chloro-3-[3-(4-m-chlorophenyl-1-piperazinyl)-pyropyl]-2,4(1H3H)-quinazolinedione maleate;

6-chloro-3-[3-(4-p-chlorophenyl-1-piperazinyl)-propyl]-2,4(1H,3H)-quinazolinedione maleate;

6-chloro-3-[5-(4-phenyl-1-piperazinyl)-pentyl]-2,4 (1H,3H)-quinazolinedione dihydrochloride;

3-[3-(4-phenyl-1-piperazinyl)-propyl]-6-chloro-2,4(1H,3H)-quinazolinedione maleate;

3-[6-(4-phenyl-1-piperazinyl)-hexyl]-2,4(1H,3H)-quinazolinedione hydrochloride; 3-[3-(phenyl-1-piperazinyl)-propyl]-2,4(1H,3H) quinazolinedione hydrochloride hydrate.

The synthetic scheme of preparing the above compounds is described by S. Hayao, U.S. Pat. 3,274,194, issued Sept. 20, 1966 and entitled "Quinazoline Derivatives". As disclosed in the latter, compounds of Formula I are prepared by reacting a corresponding o-aminobenzamide in a suitable solvent with phosgene or thiophosgene. The o-aminobenzamides which are used as the primary starting materials may be prepared from a primary amine and isatoic anhydride or a substituted derivative thereof, according to Clark and Wagner, J. Org. Chem., 9: 55 (1944). The synthesis is illustrated below in the following sequence of equations:

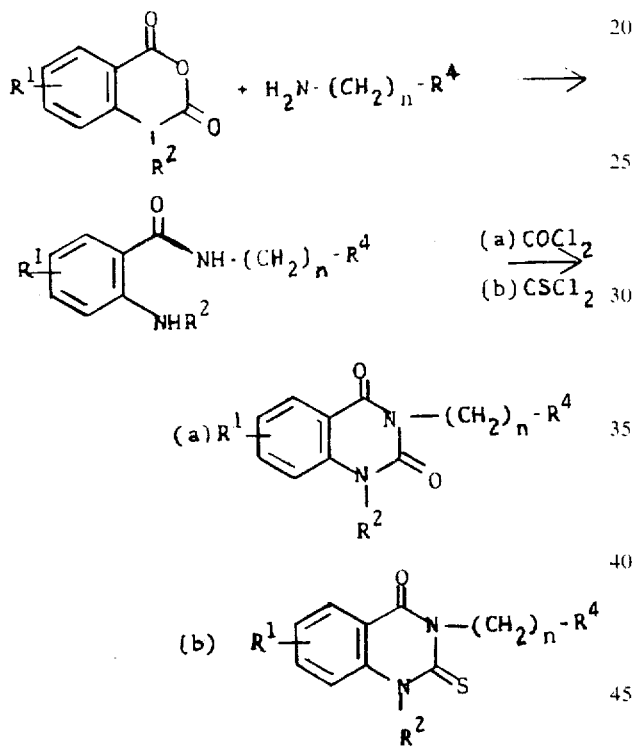

In the above equations and formulae, $R^4$ is

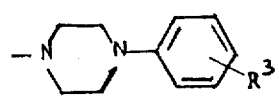

and $R^1$, $R^2$, and $R^3$ are as defined for Formula I, supra.

Compounds of Formula I can be isolated as crystalline salts as hydrochlorides, maleates, or other nontoxic acid salts.

The method of producing vasodilation in animals comprises administering to said animals an effective amount of a compound selected from the group of structures and nontoxic acid addition salts thereof represented by Formula I. The compounds can be administered orally or parenterally in doses ranging from 10 to 150 mg/kg. Therapeutic doses of the compounds may range from 150 to 300 mg/day for oral administration and 5 to 30 mg/day for parenteral administration.

An important pharmacodynamic aspect of this invention is that the vasodilation is effected both by alpha adrenergic blockade and direct smooth muscle relaxation.

Dose forms of compounds of Formula I can be conveniently prepared by combining the compounds with pharmaceutically acceptable vehicles generally used in the pharmaceutical art. The doses can be prepared in a solid or liquid state for oral, parenteral or intravenous administration.

DESCRIPTION OF THE PREFERRED EMBODIMENTS

EXAMPLE 1

Production of Vasodilation in Mice by Certain Quinazoline Derivatives Compared to Reference Vasodilators and $LD_{50}$ Data

The production of vasodilation in mice by the quinazoline derivatives listed in Table I was compared to vasodilation produced by known vasodilators, zolertine, phentolamine, and papaverine. In these tests, compounds were administered orally at graduated doses of 10, 30, and 100 mg/kg to groups of 10 mice. Indication of vasodilation was a discernable reddening of the tail within 30 minutes of administration of a given test compound. Table I summarizes the results of these tests. In each case, the minimum dose which produced vasodilation is reported.

$LD_{50}$ data refer to intraperitoneally administered doses.

TABLE I

Minimum doses required to produce vasodilation in mice of certain quinazoline compounds and reference vasodilators; $LD_{50}$ Data

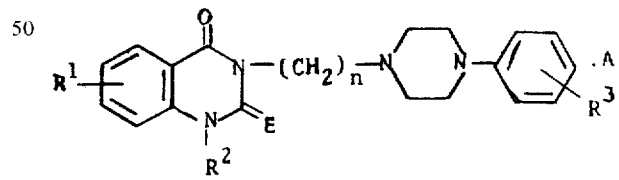

| COMPOUND | | | | | | MINIMUM DOSE (mg/kg) FOR VASODILATION | $LD_{50}$ (mg/kg) |
|---|---|---|---|---|---|---|---|
| $R^1$ and Position | $R^2$ | n | E | $R^3$ and Position | A | | |
| Cl (6) | -CH₃ | 3 | 0 | H | HCl | 100 | 2150 |
| H | H | 5 | 0 | Cl(meta) | HCl | 10 | 1470 |
| H | H | 5 | S | H | 2HCl | 10 | 215 |
| H | H | 3 | S | Cl(meta) | (CHCO₂H)₂ | 30 | 680 |
| H | H | 2 | 0 | Cl(meta) | (CHCO₂) | | |
| Cl 2 Cl | | | | | | 100 | 765 |
| Cl H | | 3 | S | H | HCl | 100 | 1000 |
| Cl (6) | H | 2 | 0 | H | (CHCO₂H)₂ | 10 | 680 |
| Cl (6) | H | 4 | 0 | H | (CHCO₂H)₂ | 30 | 680 |
| Cl (6) | H | 3 | 0 | Cl(meta) | (CHCO₂H)₂ | 100 | 1470 |
| Cl (6) | H | 3 | 0 | Cl(para) | (CHCO₂H)₂ | 100 | 1470 |
| Cl (6) | H | 5 | 0 | H | 2HCl | 30 | 1470 |
| Cl (6) | H | 3 | 0 | H | (CHCO₂H)₂ | 100 | 680 |

-continued

| R¹ and Position | COMPOUND | | | | | MINIMUM DOSE (mg/kg) FOR VASODILATION | LD₅₀ (mg/kg) |
|---|---|---|---|---|---|---|---|
| | R² | n | E | R³ and Position | A | | |
| H | H | 6 | O | H | HCl | 100 | 1470 |
| H | H | 3 | O | H | HCl·H₂O | 10 | 40 |
| | Zolertine | | | | | * | |
| | Phentolamine | | | | | 100 | |
| | Papaverine | | | | | 100 | |

*No activity at this dose

EXAMPLE 2

Production of Vasodilator Activity in the Perfused Femoral Bed of Dogs

The femoral bed of anesthetized dogs was perfused with the animal's own blood by means of a constant output pump. Perfusion pressure measured distally to the pump was taken as an indication of peripheral resistance. Test compounds and reference vasodilators were administered by intraarterial infusion at a rate of 0.33 mg/min for a total of 5 mg.

The results of these tests in summarized in Table II. In Table II, Compound A refers to 6-chloro-3[2-(4-phenyl-1-piperazinyl)ethyl]-2,4(1H,3H)-quinazoline dione maleate, Compound B refers to 3-[5-(4-phenyl-1-piperazinyl) pentyl]-2-thio-4-oxo-quinazoline dihydrochloride, Compound C is 3-[5-(4-m-chlorophenyl-1-piperazinyl)pentyl] 2,4(1H,3H)-quinazoline hydrochloride, and Compound D represents 3-[3-(phenyl-1-piperazinyl)propyl]-2,4(1H,3H) quinazolinedione hydrochloride hydrate. Reference vasodilators utilized for comparison are zolertine (referred to as Compound E), isoxuprine (referred to as Compound F), and papaverine (referred to as Compound G).

TABLE II

Effect of selected quinazoline compounds on the perfused fermoral bed of the dog

| Compound | Decrease in Perfusion Pressure, mmHg, at | | | | |
|---|---|---|---|---|---|
| | 1 mg | 2 mg | 3 mg | 4 mg | 5 mg |
| A | 4 | 6 | 4 | 4 | 4 |
| B | 12 | 10 | 8 | 6 | 4 |
| C | 48 | 49 | 48 | 41 | 36 |
| D | 24 | 22 | 22 | 22 | 22 |
| E | 32 | 34 | 32 | 34 | 34 |
| F | 40 | 30 | 30 | 28 | 32 |
| G | 19 | 18 | 20 | 25 | 27 |

EXAMPLE 3

The method of producing vasodilation using 3-[3-(phenyl-1-piperazinyl)propyl]2,4(1H,3H)-quinazoline hydrochloride hydrate was compared with phentolamine as a reference by four different methods:

A. determining effect on blood flow in the hind limb of an anesthetized dog upon intraaterial injections of graded doses;

B. determining effect on perfusion pressure in the hind limb of an anesthetized dog perfused with blood at a constant rate upon intraaterial injections of graded doses;

C. determining the antagonism elicited by graded concentrations of the vasoconstriction induced in the isolated perfused rabbit ear by an excess of potassium in the perfusion fluid, and D. determining the increase in the temperature of the surface of the ear of unanesthetized rabbits produced by graded intravenous doses.

The results of these tests are shown in Table III which follows wherein the Compound D is 3-[3-(4-phenyl-1-piperazinyl)propyl]-2,4(1H,3H)-quinazolinedione hydro-chloride hydrate.

TABLE III

| Dose necessary to: | Compound D | Phentolamine |
|---|---|---|
| Increase blood flow 100 ml/min. per method A | .004 mg/ml | .064 mg/ml |
| Decrease perfusion pressure 20 mm. of Hg. per method B | .004 mg/ml | .87 mg/ml |
| Antagonize by 50% K induced vasoconstriction per method C | .088 mg/ml | .29 mg/ml |
| Increase temperature by 7° C. per method D | .072 mg/kg | 4.6 mg/kg |

EXAMPLE 4

To determine the alpha adrenergic blocking activity of same quinazolinedione hydrochloride hydrate used in Example 3 compared to that of phentolamine, the ability of both compounds to antagonize responses of the rabbit aortic strip to epinephrine was evaluated. The procedure employed was described in J. Pharmacol. Exper. Therap. 108, 129 (1953). Contractions were elicited by adding a fixed concentration of epinephrine. The test compounds were added at various concentrations and the degree of blockade of the control response was assessed. Concentrations antagonizing such response by 50% were 0.032 mg/ml for the quinazolinedione compound and 0.033 mg/ml for phentolamine used as a reference.

Similar results are obtained when other compounds included in the general formula set forth in the summary of this invention are employed to dilate arteries of animals and thus increase blood flow.

What is claimed is:

1. A therapeutic method of producing vasodilation in an animal in need of such therapy comprising:
   administering to said animal an effective dose of a substance selected from the group consisting of compounds having the formula

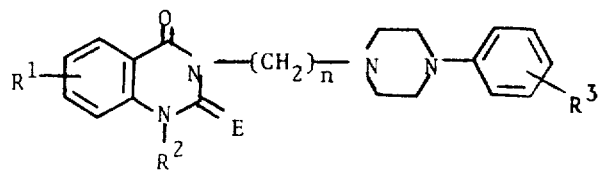

and pharmaceutically acceptable acid addition salts thereof, wherein:
   R¹ is selected from the group consisting of hydrogen and halogen;
   R² is selected from the group consisting of hydrogen and methyl;
   R³ is selected from the group consisting of hydrogen and halogen;

E is selected from the group consisting of oxygen and sulfur; and n is an integer ranging from 1 to 6, inclusive.

2. A therapeutic method of producing vasodilation in an animal in need of such therapy comprising:

administering to said animal an effective dose of a substance selected from the group consisting of compounds having the formula

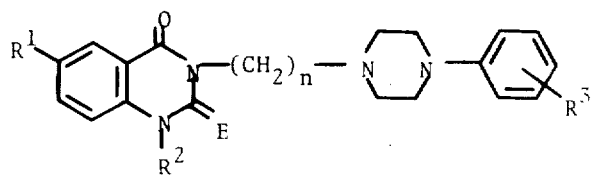

and pharmaceutically acceptable acid addition salts thereof, wherein:

$R^1$ is selected from the group consisting of hydrogen and chlorine;

$R^2$ is selected from the group consisting of hydrogen and methyl;

E is selected from the group consisting of oxygen and sulfur;

n is an integer ranging from 1 to 6 inclusive; and $R^3$ is selected from the group consisting of m-chloro and p-chloro.

3. A therapeutic method of producing vasodilation in an animal in need of such therapy comprising:

administering to said animal an effective dose of a compound selected from the group consisting of 3-[3-(4-phenyl-1-piperazinyl)-propyl]-2,4(1H,3H)-quinazolinedione, 3-[3-(4-phenyl-1-piperazinyl)-propyl]-2,4(1H,3H)-quinazolinedione hydrochloride, 3-[3-(4-phenyl-1-piperazinyl)-propyl]-2,4(1H,b 3H)-quinazolinedione hydrochloride hydrate, and 3-[3-(4-phenyl-1-piperazinyl)-propyl]-2,4(1H,3H)-quinazolinedione maleate.

4. A method as in claim 2 wherein said compound is 6-chloro-1-methyl-3-[3-(4-phenyl-1-piperazinyl)-propyl]-2,4(1H,3H)-quinazolinedione hydrochloride.

5. A method as in claim 2 wherein said compound is 3-[5-(4-m-chlorophenyl-1-piperazinyl)-pentyl]-2,4(1H,3H)-quinazolinedione hydrochloride.

6. A method as in claim 2 wherein said compound is 3-[5-(4-phenyl-1-piperazinyl)pentyl]-2-thio-4-oxo(1H,3H)-quinazoline dihydrochloride.

7. A method as in claim 2 wherein said compound is 3-[3-(4-m-chlorophenyl-1-piperazinyl)-propyl]-2-thio-4-oxo(1H,3H)-quinazoline maleate.

8. A method as in claim 2 wherein said compound is 3-[2-(4-m-chlorophenyl-1-piperazinyl)-ethyl]-2,4(1H,3H)-quinazolinedione maleate.

9. A method as in claim 2 wherein said compound is 3-[3(4-phenyl-1-piperazinyl)-propyl]-6-chloro-2-thio-4-oxo(1H,3H)-quinazoline hydrochloride.

10. A method as in claim 2 wherein said compound is 6-chloro-3-[2,-(4-phenyl-1-piperazinyl)-ethyl]-2,4(1H,3H)-quinazolinedione maleate.

11. A method as in claim 2 wherein said compound is 6-chloro-3-3-[4-(4-phenyl-1-piperazinyl)-butyl]-2,4(1H,3H)-quinazolinedione maleate.

12. A method as in claim 2 wherein said compound is 6-chloro-3-[3-(4-m-chlorophenyl-1-piperazinyl)-propyl]-2,4(1H,3H)-quinazolinedione maleate.

13. A method as in claim 2 wherein said compound is 6-chloro-3-[3-(4-p-chlorophenyl-1-piperazinyl)-propyl]-2,4(1H,3H)-quinazolinedione maleate.

14. A method as in claim 2 wherein said compound is 6-chloro-3-[5-(4-phenyl-1-piperazinyl)-pentyl]-2,4(1H,3H)-quinazolinedione dihydrochloride.

15. A method as in claim 2 wherein said compound is 3-[3-(4-phenyl-1-piperazinyl)-propyl]-6-chloro-2,4(1H,3H)-quinazolinedione maleate.

16. A method as in claim 2 wherein said compound is 3-[6-(4-phenyl-1-piperazinyl)-hexyl]-2,4(1H,3H)-quinazolinedione hydrochloride.

17. A method as in claim 2 wherein said compound is administered orally.

18. A method as in claim 2 wherein said compound is administered parenterally.

19. A method as in claim 2 wherein said dose ranges from 10 mg/kg to 100 mg/kg.

20. A method as in claim 2 wherein said dose ranges from 150 to 300 mg per day.

21. A method as in claim 2 wherein said compound is administered in a pharmaceutically acceptable carrier.

22. A method as in claim 21 wherein said carrier is a solid.

23. A method as in claim 21 wherein said carrier is a liquid.

* * * * *